(12) United States Patent
Princell et al.

(10) Patent No.: US 6,902,784 B2
(45) Date of Patent: Jun. 7, 2005

(54) COMPOSITE PRESSURE SENSITIVE INSULATION JOINING CONSTRUCTION

(75) Inventors: Charles M. Princell, Hickory, NC (US); Kartik A. Patel, Chapel Hill, NC (US); Holger Wilhelm Johann, Chapel Hill, NC (US)

(73) Assignee: Armacell Enterprise GmbH (DE)

(\*) Notice: Subject to any disclaimer, the term of this patent is extended or adjusted under 35 U.S.C. 154(b) by 41 days.

(21) Appl. No.: 10/427,365

(22) Filed: May 1, 2003

(65) Prior Publication Data

US 2003/0215595 A1 Nov. 20, 2003

Related U.S. Application Data

(60) Provisional application No. 60/381,308, filed on May 17, 2002.

(51) Int. Cl.[7] .................................................. B32B 3/00
(52) U.S. Cl. .................. 428/40.1; 156/218; 156/297; 427/208; 427/208.4; 428/41.9; 428/42.1; 428/42.2; 428/42.3; 428/43; 428/66.6; 428/66.7

(58) Field of Search ............................... 428/40.1, 41.9, 428/42.1, 42.2, 42.3, 43, 66.6, 66.7, 136; 156/218, 297; 427/208, 208.4

(56) References Cited

U.S. PATENT DOCUMENTS 6,162,534 A \* 12/2000 Hamerski .................... 428/354

FOREIGN PATENT DOCUMENTS

DE         90 06 975.7         6/1990

\* cited by examiner

*Primary Examiner*—Nasser Ahmad
(74) *Attorney, Agent, or Firm*—Womble Carlyle Sandridge & Rice, PLLC

(57) ABSTRACT

Disclosed is a pressure sensitive adhesive insulation structure for joining two adjacent insulation structures. The pressure sensitive insulation comprises a carrier having a first side and second side. A pressure sensitive adhesive is in communication with the first side and in communication with the second side for adhering an insulation structure, such as those used to insulate piping.

3 Claims, 4 Drawing Sheets

COMPOSITE PRESSURE SENSITIVE INSULATION JOINING CONSTRUCTION

RELATED INFORMATION

This application is a non-provisional application claiming the benefit of Provisional Application Ser. No. 60/381,308, filed May 17, 2002, the content of which is hereby incorporated in its entirety.

TECHNICAL FIELD

The present invention relates to a composite pressure sensitive adhesive construction wherein the cellular foam construction has pressure sensitive adhesive portions located parallel on both sides.

BACKGROUND

One current method utilizing pressure sensitive adhesives involves a single-face pressure sensitive adhesive coated tape, that is, a tape system having a carrier, an adhesive layer applied on one side of the carrier, and release liner applied to the adhesive layer. The release liner would normally be removed so that the tape could be attached perpendicular to, and run equal with, a pipe, thus covering both ends of adjoining insulation tubes. The remaining release liner would be removed and the adhesive coated tape wrapped circumferentially at the intersection of adjoining insulation tubes. However, this method generally results in poor joint seal properties allowing condensation to form on the insulation surface at pressure sensitive adhesive tape joints.

One system of joining insulation that is utilized is commonly called the "contact adhesive joining" method. According to this system, a layer of contact adhesive is applied to each insulation tube face. A specific dwell time is recognized to allow included volatiles to off-gas. At such time that the contact adhesive demonstrates sufficient surface tack, the adjoining adhesive coated insulation tube faces are joined forming a contact adhesive bond. Furthermore, the application of an exact contact adhesive layer was difficult to obtain since the on-the-job application often involved working under difficult conditions. If the dwell time allowed for the off-gassing of volatiles from the contact adhesive layers is either too long or too short, the quality of the joint bond and the sealing properties are substandard, thus, allowing condensation to form on the surface of the insulation envelope at the insulation joint. The corrosive and aesthetic damage associated with water formation as a result of condensation requires insulation to be removed and replaced.

SUMMARY

The present invention comprises a pressure sensitive adhesive insulation structure for joining two adjacent insulation structures. The pressure sensitive insulation comprises a carrier having a first side and second side. A pressure sensitive adhesive is in communication with the first side and in communication with the second side for adhering an insulation structure, such as those used to insulate piping.

In greater detail, the pressure sensitive adhesive insulation structure includes a void space located in a center section of the carrier, whereby the carrier may fit around a section of pipe. Additionally, a longitudinal split extending from the center section to an outer edge of the carrier is added to aid in placing the carrier around the pipe. The carrier may be formed out of a foamed structure or a nonfoamed material such as a plastic or noncorrosive metal material. Additionally, a non-elastic layer may be added to the first side of the carrier and the second side of the carrier to prevent the adhesive from elongating under stress.

A further embodiment includes a method for forming a pressure sensitive adhesive insulation structure. The method includes providing a carrier having a first side and second side and providing a pressure sensitive adhesive and applying the pressure sensitive adhesive to the first side and applying the pressure sensitive adhesive to the second side. The method also includes forming a void in a center portion of the carrier and forming a longitudinal split extending from the center section to an outer edge of the carrier. Additionally, a release liner may be applied to the pressure sensitive adhesive.

A further embodiment includes a method of attaching two adjacent insulation structures. The method includes providing a carrier having a first side and second side and a pressure sensitive adhesive in communication with the first side and in communication with the second side. Next, the method includes adhering a first insulation support structure to the first side and adhering a second insulation support structure to the second side and forming a void in a center portion of the carrier.

DISCLOSURE OF INVENTION

Figure 1:
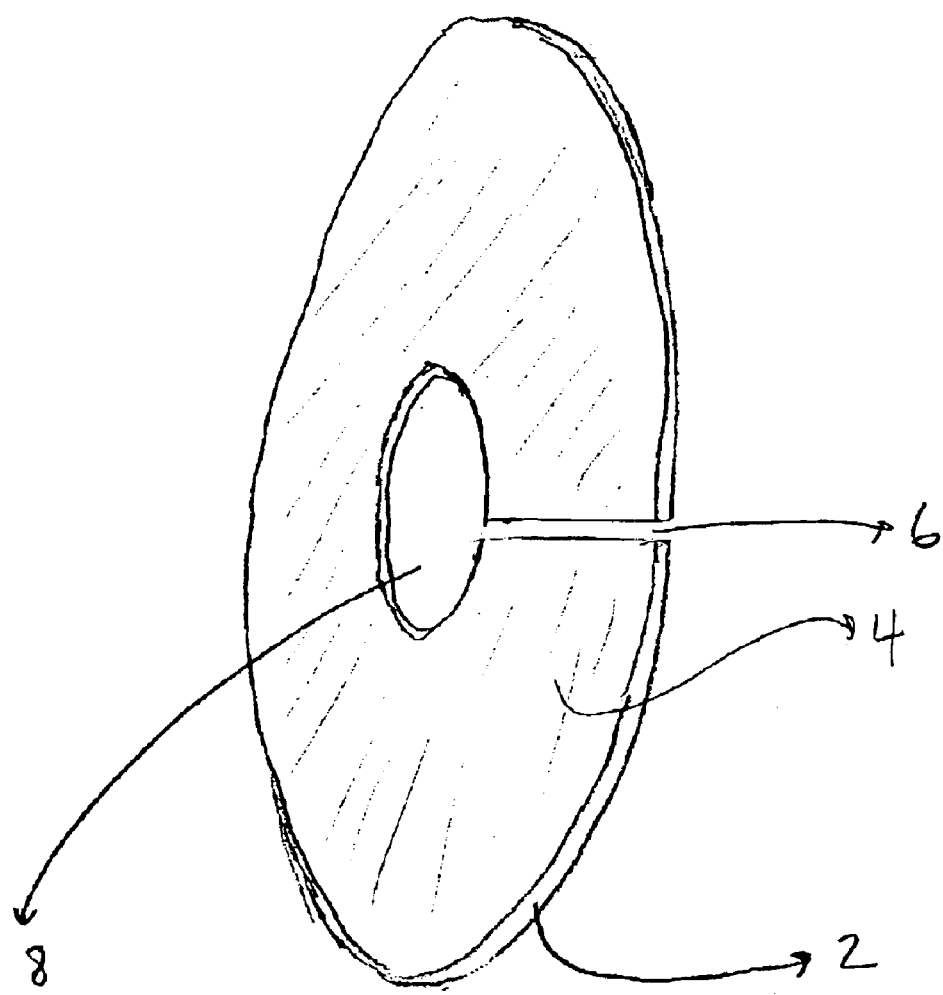
FIG. 1 is a cross-sectional view of one embodiment of a composite pressure sensitive adhesive construction according to the present invention.

The present invention includes an article having a longitudinal split 6 through one wall of the annular shaped construction in a pressure sensitive adhesive 4. The pressure sensitive adhesive layer may be comprised of a hotmelt pressure sensitive adhesive. The pressure sensitive adhesive layer 4 includes a single carrier or carrier layer 2 having two separate areas of pressure sensitive adhesive 4 located on at least two sides thereof at the parallel portions of the carrier 2. A void space 8 is located in the central portion of the carrier 2 and is free from the pressure sensitive adhesive layer 4 located between the parallel portions.

The pressure sensitive adhesive layer 4 and carrier 2 may further include dual release liners 14. The release liners are attached to parallel pressure sensitive adhesive layers on both sides of the carrier 2. The release liner 14 may be folded in such a manner as to form a release tab 16.

Furthermore, the lateral pressure sensitive adhesive layer 4 may extend to the lateral edges of the carrier 2. The article may serve as insulation for a pipe, which is located about the pipe. The release liner 14 is removed from one face of the carrier 2. In an embodiment, the carrier 2 may be aligned and affixed to a non-elastic layer 10 with the side opposite the release removed and exposed to the pressure sensitive adhesive layer 4 and is then adhered to an adjoining face of an insulative structure 12 such as pipe insulation.

In greater detail, FIG. 1 illustrates the carrier 2 having the pressure sensitive layer 4 residing thereon. The carrier has a slit 6 running through the annual ring of the carrier 2 to aid in installing the article. The slit 6 may extend from the center section and extend to the outer edge of the carrier 2. Additionally, a void space 8, located in the central portion, is provided in the carrier 2 to fit the article around a pipe. The carrier may be formed from a foamed polymer.

Figure 2:
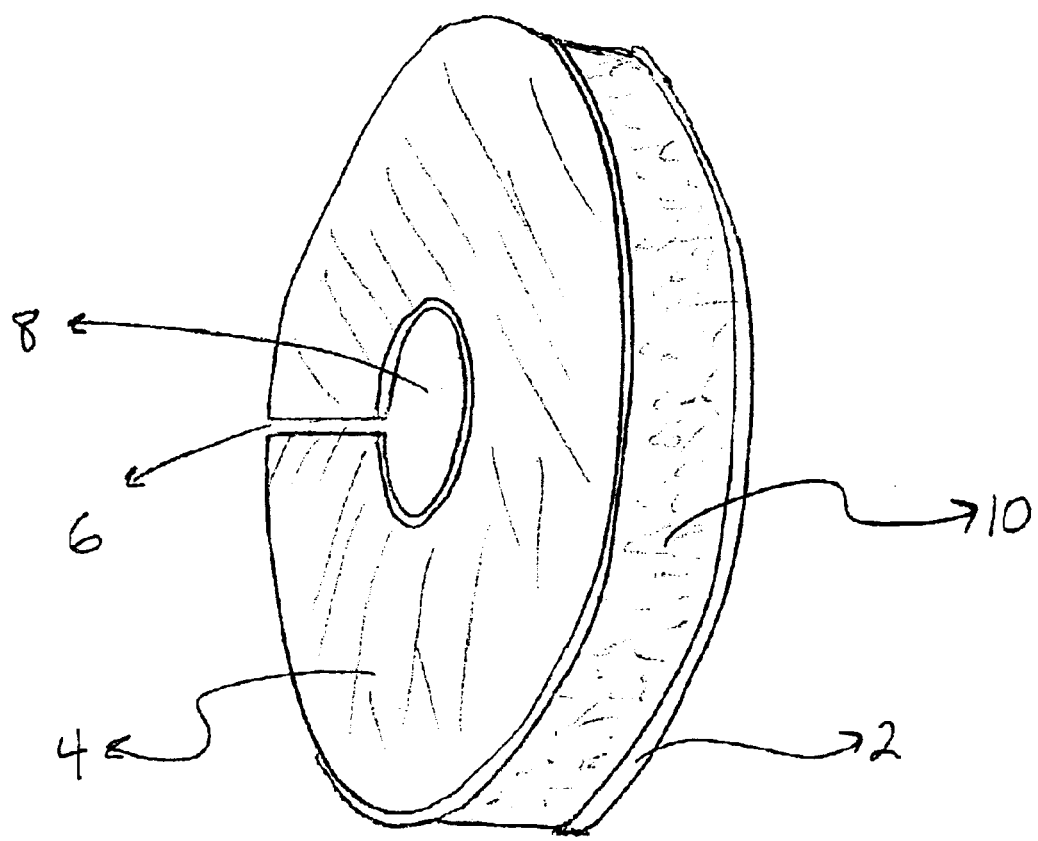
FIG. 2 is a cross-sectional view of the composite pressure sensitive adhesive construction according to the present invention including a non-elastic layer.

FIG. 2 illustrates the pressure sensitive adhesive insulation structure comprising a non-elastic layer 10 sandwiched between two adjacent carrier layers 2. The carrier layers 2 are affixed to the non-elastic layer 10 by the pressure sensitive adhesive layer 4. The sides of the carrier layers 2 facing outward from the non-elastic layer 10 also have a pressure sensitive adhesive 4. The non-elastic layer 10 may be formed from most any material. In one embodiment, the non-elastic layer 10 is formed from foamed glass.

Figure 3:
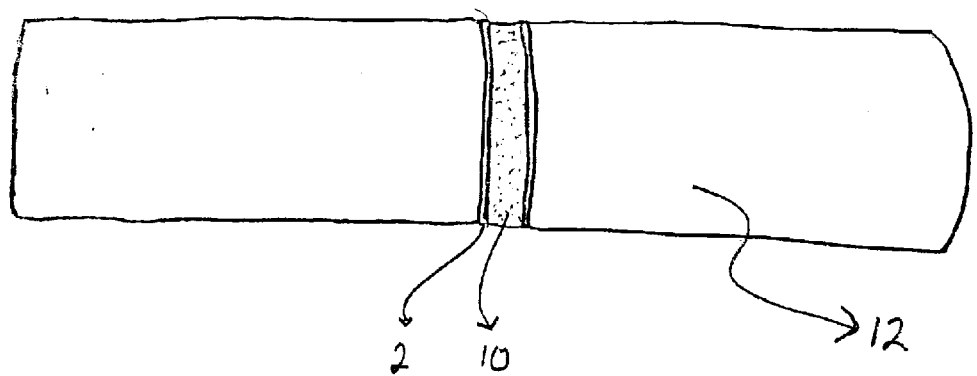
FIG. 3 is a plan view of two pipe insulation tubes having the composite pressure sensitive construction of the present invention joining two ends of adjacent insulative structures.

FIG. 3 is an embodiment wherein a pair of insulative tubes 12 are joined by the pressure sensitive adhesive insulation structure. The insulative tubes 12 are typically foamed pipe insulation tubes formed from a foamed polymer. While FIG. 3 illustrates the non-elastic layer 10 embodiment of the pressure sensitive adhesive insulation structure, the insulative tubes 12 may be joined by only the carrier 2 and pressure sensitive adhesive layer 4.

Figure 4:
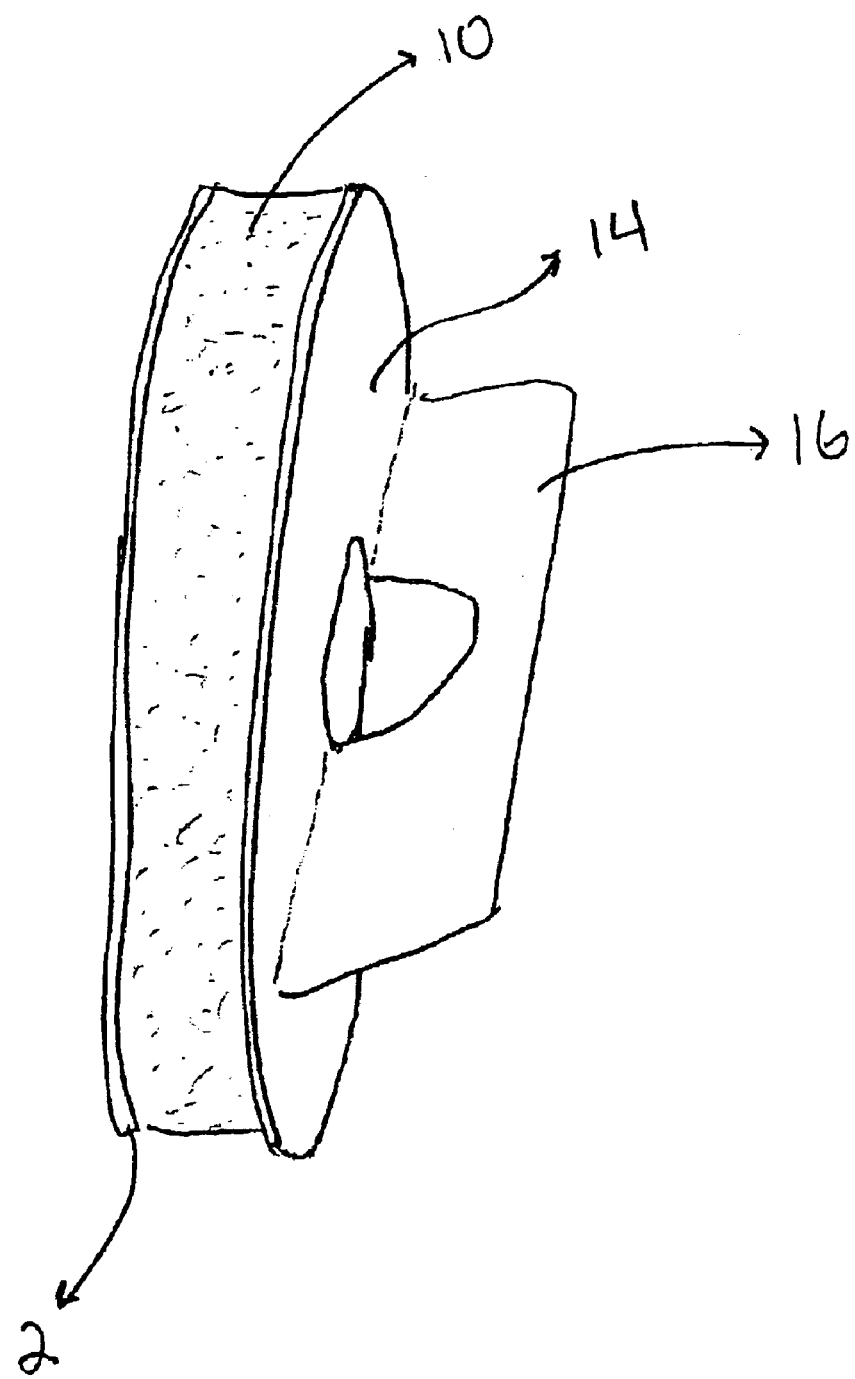
FIG. 4 is a cross-sectional view of one embodiment of a composite pressure sensitive adhesive showing the partial removal of an annular shaped release liner illustrating the release tabs extending from the liner.

FIG. 4 illustrates an embodiment of the pressure sensitive adhesive insulation structure including a release liner 14. The insulation structure comprises a single carrier layer 2 having a parallel side-opposite pressure sensitive adhesive layer 4. A central void area 8 located between the parallel side-opposite portions, the central area is free of adhesive. Separate and parallel release liners 14 are each located on one of the parallel adhesive layers 4 and may overlap a portion of the central void area 8. The release liner 14 may be folded in such a manner as to form a release tab 16. The release tab 16 may be integral with the release liner 14 or may be separately attached to the release liner 14.

Additionally, a process is provided including the steps of removing a release liner 14 from one parallel face portion of a pressure sensitive adhesive layer 4 of an annular shaped carrier layer 2. The carrier layer 2 includes two separate areas of a pressure sensitive adhesive layer 4 located on each side of the carrier 2. A further step includes applying the exposed pressure sensitive adhesive layer 4 of the adhesive construction to an end face of the longitudinally slit or unslit annular insulation tube 12 so that the central adhesive-free portion 8 overlies the annular insulation tube. The pressure sensitive adhesive layer 4 has a single release liner 14 thereon extending into the adhesive-free area and release liner folded in such a manner forming a pull-tab 16 that can be pulled to remove the liner 14.

The process further includes installing the article, and removing the release liner 14 before applying the parallel adhesive portion, and then applying the remaining side opposite parallel adhesive portion to the face of an adjoining annular insulation tube 12 or other article. The process further includes placing the adhesive-free central area over the annular opening or void 8. Additionally, the article can serve as insulation and includes applying the insulation to a conduit before applying one side of pressure sensitive adhesive carrier face to the annular insulation end and side opposite pressure sensitive adhesive face to adjoining annular insulation tube 12 face.

It will be understood by those skilled in the art that while the present invention has been disclosed above, with reference to preferred embodiments, various modifications, changes and additions can be made to the foregoing invention without departing from the spirit and scope thereof.

What is claimed is:

1. A pressure sensitive adhesive insulation structure for joining two adjacent insulation structures, the pressure sensitive insulation comprising:

a carrier having a first side and a second side, a void space located in a center section of the carrier and a longitudinal split extending from the center section to an outer edge of the carrier; and a pressure sensitive adhesive in communication with the first side and in communication with the second side.

2. A method of forming a pressure sensitive adhesive insulation structure comprising:

providing a carrier having a first side and second side;

forming a void in a center portion of the carrier;

forming a longitudinal split extending from the center section to an outer edge of the carrier; and providing a pressure sensitive adhesive and applying the pressure sensitive adhesive to the first side and applying the pressure sensitive adhesive to the second side.

3. A method of attaching two adjacent insulation structures comprising:

providing a carrier having a first side and second side and a pressure sensitive adhesive in communication with the first side and in communication with the second side;

forming a void in a center portion of the carrier;

forming a longitudinal split extending from the center section to an outer edge of the carrier; and adhering a first insulation support structure to the first side and adhering a second insulation support structure to the second side.

\* \* \* \* \*

US006902784C1

(12) EX PARTE REEXAMINATION CERTIFICATE (10398th)

United States Patent
Princell et al.

(10) Number: US 6,902,784 C1
(45) Certificate Issued: Nov. 12, 2014

(54) COMPOSITE PRESSURE SENSITIVE INSULATION JOINING CONSTRUCTION

(75) Inventors: Charles M. Princell, Hickory, NC (US); Kartik A. Patel, Chapel Hill, NC (US); Holger Wilhelm Johann, Chapel Hill, NC (US)

(73) Assignee: Credit Suisse AG, Cayman Islands Branch, New York, NY (US)

Reexamination Request:
No. 90/013,143, Feb. 3, 2014

Reexamination Certificate for:
Patent No.: 6,902,784
Issued: Jun. 7, 2005
Appl. No.: 10/427,365
Filed: May 1, 2003

Related U.S. Application Data

(60) Provisional application No. 60/381,308, filed on May 17, 2002.

(51) Int. Cl.
*C09J 7/02* (2006.01)

(52) U.S. Cl.
CPC . *C09J 7/0289* (2013.01); *C09J 7/02* (2013.01)

USPC ....... 428/40.1; 428/41.9; 428/42.1; 428/42.2; 428/42.3; 428/43; 428/66.6; 428/66.7; 428/136; 156/218; 156/297; 427/208; 427/208.4

(58) Field of Classification Search
USPC .............. 428/40.1, 41.9, 42.1, 42.2, 42.3, 43, 428/66.6, 66.7; 156/218, 297; 427/208, 427/208.4
See application file for complete search history.

(56) References Cited

To view the complete listing of prior art documents cited during the proceeding for Reexamination Control Number 90/013,143, please refer to the USPTO's public Patent Application Information Retrieval (PAIR) system under the Display References tab.

*Primary Examiner* — Norca L Torres Velazquez

(57) ABSTRACT

Disclosed is a pressure sensitive adhesive insulation structure for joining two adjacent insulation structures. The pressure sensitive insulation comprises a carrier having a first side and second side. A pressure sensitive adhesive is in communication with the first side and in communication with the second side for adhering an insulation structure, such as those used to insulate piping.

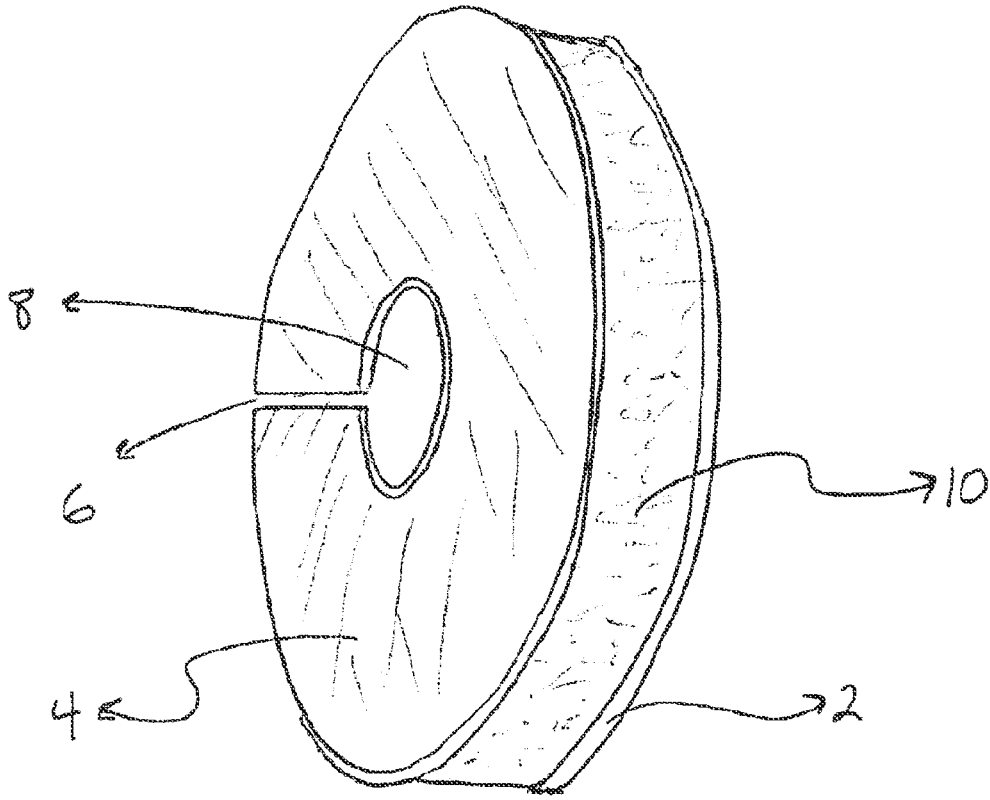

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 are cancelled.

\* \* \* \* \*